(No Model.)

H. C. MONTGOMERY.
SEWER GAS TRAP.

No. 382,656. Patented May 8, 1888.

Witnesses.
Irene L. Corey.
John T. Hutchins.

Harry C. Montgomery.
Inventor,
by H. T. Fisher.
Attorney.

UNITED STATES PATENT OFFICE.

HARRY C. MONTGOMERY, OF CLEVELAND, OHIO.

SEWER GAS-TRAP.

SPECIFICATION forming part of Letters Patent No. 382,656, dated May 8, 1888.

Application filed March 15, 1888. Serial No. 267,209. (No model.)

*To all whom it may concern:*

Be it known that I, HARRY C. MONTGOMERY, a citizen of the United States, residing at Cleveland, in the county of Cuyahoga and State of Ohio, have invented certain new and useful Improvements in Sewer Gas-Traps; and I do hereby declare that the following is a full, clear, and exact description of the invention, which will enable others skilled in the art to which it appertains to make and use the same.

The invention herein is an improvement in sewer gas traps; and it consists in a trap having a gravity ball-valve and certain features of construction associated therewith, substantially as shown and described, and particularly pointed out in the claims.

Figure 2:
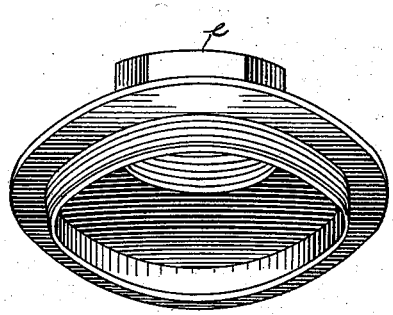
Figure 3:
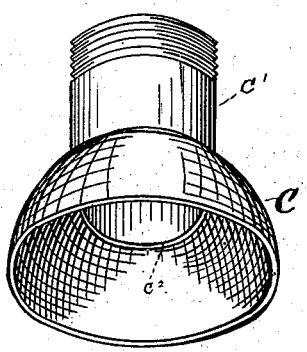
Figure 1:
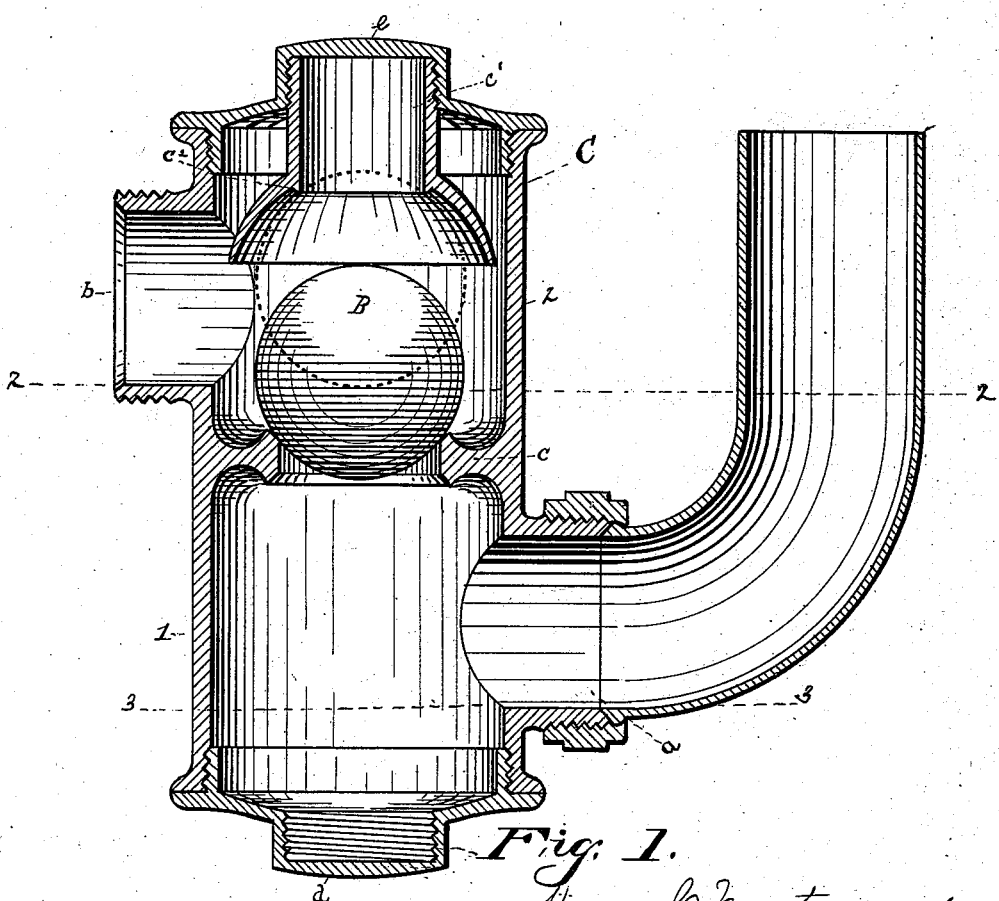

In the accompanying drawings, Figure 1 is a sectional elevation of my improved trap as organized for operation, and Figs. 2 and 3 are details of parts.

A represents the case or body of the trap, which is a plain tubular piece of uniform cross-section throughout its length and provided with induction and eduction openings $a$ $b$ at opposite sides and near the respective ends of the body adapted to make the usual pipe-connections. At the center of the case I provide a diaphragm, $c$, which has a central opening, with valve-seats on both sides. This diaphragm divides the case or body of the trap into two corresponding chambers, 1 2, of identical construction throughout, so that the case may be reversed and yet operate exactly the same as in the position in which it is shown in the drawings. This makes the trap much more available than it would be otherwise and prevents possible mistake by unskilled or careless workmen in coupling up the parts, as would be liable to occur if the trap were not thus reversible. As it is, no such mistake can happen, and the trap may be inverted at pleasure. In furtherance of this idea the screw-caps $d$ $e$, which close the ends of the case, are made interchangeable, so that it is immaterial on which end they are placed. The convenience and usefulness of the trap are greatly enhanced by this construction.

B represents a gravity ball-valve, made, preferably, of rubber, but any other suitable material may be substituted for the rubber, the only points to be kept in view being durability and the proper size and weight to get the desired action. This ball, if of rubber, will be somewhat hollow and so graded with respect to weight that it will seat itself by its own gravity when the water in the trap falls to the level of the bottom of the outlet $b$, (see dotted line 2 2,) which, of course, is the level of the water seal in the trap. A further essential in the character or composition of the valve is that, while it will seat itself and perfect the seal mechanically when immersed about or nearly half its depth in water, it will respond to any appreciable flow of water into the trap and readily rise from its seat to permit the necessary overflow and relief. A full head of water will carry the valve to the position seen in dotted lines, Fig. 1, and when in this position the fluid-passage through the trap about the valve is so widely opened and clear of obstruction that the trash and refuse which commonly enter a sink-trap and by reason of faulty construction lodge in most of them will pass as readily through my trap as if no valve-seal were provided. This is accounted for by the large rounded openings provided at all points and the elevation of the valve to such a level that it offers no practical resistance to the flow of fluid or the passage of foreign matter with the current beneath or about the ball through the outlet $b$. In fact, while this construction combines all the advantages of a heavy water seal and a perfect mechanical or valve seal in addition, the water-passage still is so free and open when in actual service that it amounts practically to a mere elbow in what is otherwise an unobstructed fluid pipe or conduit—that is to say, the way through the trap is so open and clear and the ball gets so completely out of the way when water is passing through that the seal mechanism cannot be considered an obstruction to the passage. This I do not understand to be the result or advantage in any other trap of the same general character known to me or in common use.

C represents a bell-shaped stop and guide having a threaded stem, $c'$, screwing into the interior of the upper cap, $e$, which has a central extension for this purpose. The said stop and guide is made with an interior diameter sufficiently large to prevent the ball from locking therein when it occupies the bell, and a slight head or flange, $c^2$, is formed on the interior about the neck of the bell, which serves as a stop for the ball, and against which the ball may float and be out of contact with the bell at other points. This effectually prevents lodgment of the ball when the water recedes. It will be observed that the bell flares in every direction sufficiently to intercept the ball when it rises any material distance from its seat, so that when a full head of water is on the ball will rest directly over its seat, from which, as before described, it gradually descends by gravity when the flow ceases and the water subsides to its normal quantity and level in the trap. This also prevents the ball from lodging at any point but on its seat, and the bell is so arranged that, while it offers no obstruction to the water-passage, it reaches out sufficiently to prevent the ball from closing or obstructing the discharge-opening $b$.

It will be seen in Fig. 1 that by this construction of trap a sediment-chamber is formed in the bottom of the trap—say on the line 3 3—which will catch such heavy articles as gravel, nails, and the like, which are too heavy to be carried through the trap by the current, and must have a lodgment somewhere from which they can be readily removed. This chamber is accessible for the purpose by means of screw-caps $d$, or the cap $e$, if the trap be reversed.

An important and valuable feature in my trap is its accessibility and convenience for general cleaning, when such cleaning for any reason becomes necessary.

It has been observed that the caps at both ends are removable, and when removed throw both chambers above and below the diaphragm wide open. Then by removing the ball-valve a wide-open passage through the trap is obtained, which brings any portion of the interior plainly into view and within easy reach by hand or instruments. A heavy wiping-cloth can be introduced to clean the parts, and may be drawn through the trap for this purpose, or any other means of cleansing may be adopted. Any one who has a wrench to remove the caps can perform this service.

In the construction of this trap I do not, of course, limit myself to the precise form of the several parts here shown and described, and of course have the right of such modifications or equivalents as clearly fall within the scope of the invention.

The ball always being partly exposed when seated, any back-pressure of gas thereon from the main sewer would only tend to make the seal more perfect, if possible, and effectually prevent the passage of gas through the trap.

Having thus described my invention, what I claim as new, and desire to secure by Letters Patent, is—

1. In a sewer-trap, a body part having the form of a section of cylindrical tubing and caps closing the ends of said body, a diaphragm extending across the interior of the said body at or near its center and having a valve-seat, a ball-valve above the diaphragm seating itself by gravity, an inlet at the side of the body below the diaphragm, and an outlet above the diaphragm having its lower edge raised about one-third the diameter of the valve above the valve-seat, whereby a water seal is formed above said valve-seat, substantially as set forth.

2. In a sewer-trap, a substantially-cylindrical body having its ends open the full width of the body and directly opposite each other, and screw-caps for closing the ends, a central diaphragm dividing the body into two separate chambers, an inlet-port below the diaphragm, and an outlet-port above the diaphragm at the sides of the body, a gravity-valve, and a guide and a stop therefor, substantially as set forth.

3. A reversible sewer-trap consisting, essentially, of a body part having a diaphragm at its center provided with opposite valve-seats, openings for the induction and eduction of water at equal distances from said diaphragm near the respective ends of the body part, and the ends of the body part closed by removable caps with a ball-valve, substantially as set forth.

4. In sewer-traps, a reversible trap having substantially the following distinguishing features: a body part with a diaphragm at its center having valve-seats on each side, fluid inlet and outlet ports on either side of the diaphragm at equal distances therefrom and about midway between the said diaphragm and the ends of the body part, whereby a water seal is maintained about the valve and a sediment-chamber is formed in the bottom of the trap, a ball-valve above the diaphragm, and a guide therefor, substantially as set forth.

HARRY C. MONTGOMERY.

Witnesses:
H. T. FISHER,
I. L. COREY.